United States Patent
Yim et al.

(10) Patent No.: US 10,021,460 B2
(45) Date of Patent: *Jul. 10, 2018

(54) BROADCASTING RECEIVING APPARATUS AND CONTROL METHOD THEREOF

(71) Applicant: SAMSUNG ELECTRONICS CO., LTD., Suwon-si (KR)

(72) Inventors: Jin-ho Yim, Suwon-si (KR); Seung-chul Shin, Gangneung-si (KR); Hee-jeong Bae, Suwon-si (KR); Kyoung-nyo Hwangbo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,913

(22) Filed: May 12, 2017

(65) Prior Publication Data

US 2017/0251270 A1    Aug. 31, 2017

Related U.S. Application Data

(63) Continuation of application No. 14/644,043, filed on Mar. 10, 2015, now Pat. No. 9,674,477, which is a (Continued)

(30) Foreign Application Priority Data

Dec. 10, 2008    (KR) .................. 10-2008-0125455

(51) Int. Cl.
  *H04N 5/445*   (2011.01)
  *H04N 21/482*  (2011.01)
  (Continued)

(52) U.S. Cl.
  CPC ..... *H04N 21/4826* (2013.01); *H04N 21/4312* (2013.01); *H04N 21/4583* (2013.01);
  (Continued)

(58) Field of Classification Search
  CPC .. H04N 5/44543; H04N 21/482; H04N 21/84; H04N 21/4622; H04N 21/47214; H04N 21/4821
  (Continued)

(56) References Cited

U.S. PATENT DOCUMENTS 5,253,066 A   10/1993  Vogel
5,977,964 A   11/1999  Williams et al.
(Continued)

FOREIGN PATENT DOCUMENTS

EP    2051509 A1      4/2009
JP    2004-328244 A   11/2004
(Continued)

OTHER PUBLICATIONS

Communication dated Dec. 4, 2015, issued by the Korean Intellectual Property Office in counterpart Korean Patent Application 10-2015-0031145.
(Continued)

*Primary Examiner* — Annan Shang
(74) *Attorney, Agent, or Firm* — Sughrue Mion, PLLC

(57) ABSTRACT

Provided is a broadcasting receiving apparatus and a control method thereof capable of receiving recommendation information, the control method of a broadcasting receiving apparatus receiving recommendation information about a broadcasting program; comparing a time of confirming the recommendation information and a broadcasting time of a recommended program included in the recommendation information; and supplying a function of the broadcasting receiving apparatus for using the recommendation information to correspond to a comparison result. Accordingly, a broadcasting receiving apparatus and a control method thereof capable of supplying a broadcasting service having an improved user convenience is provided.

24 Claims, 6 Drawing Sheets

Related U.S. Application Data continuation of application No. 12/616,580, filed on Nov. 11, 2009, now Pat. No. 9,094,639.

(51) Int. Cl.
*H04N 21/431* (2011.01)
*H04N 21/4788* (2011.01)
*H04N 21/472* (2011.01)
*H04N 21/458* (2011.01)

(52) U.S. Cl.
CPC ... *H04N 21/4788* (2013.01); *H04N 21/47214* (2013.01); *H04N 21/4821* (2013.01)

(58) Field of Classification Search
USPC .................................................. 725/37–61
See application file for complete search history.

(56) References Cited

U.S. PATENT DOCUMENTS

| | | | |
|---|---|---|---|
| 6,163,316 A | 12/2000 | Killian | |
| 6,177,931 B1 | 1/2001 | Alexander et al. | |
| 6,185,360 B1 | 2/2001 | Inoue et al. | |
| 7,017,172 B2 | 3/2006 | Schaffer et al. | |
| 7,289,160 B2 | 10/2007 | Takase | |
| 7,587,731 B1 | 9/2009 | Oyabu et al. | |
| 7,644,427 B1 | 1/2010 | Horvitz et al. | |
| 7,653,927 B1 | 1/2010 | Kapner, III et al. | |
| 7,770,196 B1 | 8/2010 | Hendricks | |
| 7,840,178 B2 | 11/2010 | Hellman | |
| 8,782,680 B2 * | 7/2014 | Cook ................ | H04N 5/44543 725/10 |
| 2001/0024565 A1 | 9/2001 | Yui et al. | |
| 2002/0042917 A1 * | 4/2002 | Townsend ............... | H04N 5/44 725/41 |
| 2002/0083448 A1 * | 6/2002 | Johnson ............. | H04N 5/44543 725/39 |
| 2003/0081936 A1 | 5/2003 | Kim | |
| 2003/0093793 A1 | 5/2003 | Gutta | |
| 2003/0115602 A1 | 6/2003 | Knee et al. | |
| 2004/0158853 A1 | 8/2004 | Doi et al. | |
| 2004/0168187 A1 | 8/2004 | Chang | |
| 2005/0055713 A1 * | 3/2005 | Lee ...................... | H04N 7/163 725/46 |
| 2005/0125844 A1 * | 6/2005 | Maruyama ......... | H04N 5/44543 725/135 |
| 2005/0175104 A1 | 8/2005 | Honda et al. | |
| 2005/0229211 A1 | 10/2005 | Iino | |
| 2005/0251821 A1 | 11/2005 | Pina | |
| 2006/0143653 A1 | 6/2006 | Suh | |
| 2007/0172196 A1 | 7/2007 | Kusunoki et al. | |
| 2007/0192796 A1 | 8/2007 | Iwabuchi et al. | |
| 2007/0283409 A1 | 12/2007 | Golden | |
| 2008/0082998 A1 | 4/2008 | Han | |
| 2008/0141323 A1 | 6/2008 | Munetsugu et al. | |
| 2008/0155607 A1 * | 6/2008 | Klappert ............ | H04N 5/44543 725/58 |
| 2008/0172696 A1 * | 7/2008 | Furusawa ......... | G06F 17/30867 725/46 |
| 2008/0201735 A1 | 8/2008 | Sumiyoshi et al. | |
| 2009/0025032 A1 * | 1/2009 | Morita ................ | H04N 5/4403 725/39 |
| 2009/0049473 A1 * | 2/2009 | Pickelsimer ...... | G06F 17/30058 725/40 |
| 2009/0199242 A1 | 8/2009 | Johnson et al. | |
| 2010/0086277 A1 | 4/2010 | Craner | |
| 2010/0153986 A1 | 6/2010 | Ellis | |
| 2012/0141096 A1 | 6/2012 | Ellis et al. | |
| 2013/0308925 A1 | 11/2013 | Ellis et al. | |

FOREIGN PATENT DOCUMENTS

| | | |
|---|---|---|
| KR | 10-2006-0073071 A | 6/2006 |
| KR | 10-2006-0113622 A | 11/2006 |
| KR | 10-2007-0027007 A | 3/2007 |
| WO | 2008/018550 A1 | 2/2008 |

OTHER PUBLICATIONS

Communication dated Dec. 4, 2015, issued by the Korean Intellectual Property Office in counterpart Korean Patent Application 10-2008-0125455.

Communication dated May 6, 2015 issued by the Korean Intellectual Property Office in counterpart Korean Patent Application No. 10-2015-0031145.

Extended European Search Report dated Jun. 15, 2010, in counterpart European Application No. 09177803.5.

Communication dated Sep. 18, 2014 issued by the Korean Intellectual Property Office in counterpart Korean Patent Application No. 10-2008-0125455.

Decision of Rejection dated Feb. 2, 2015 issued by the Korean Intellectual Property Office in counterpart Korean Patent Application No. 10-2008-0125455.

* cited by examiner

BROADCASTING RECEIVING APPARATUS AND CONTROL METHOD THEREOF

CROSS-REFERENCE TO RELATED APPLICATION

This is a continuation application of U.S. patent application Ser. No. 14/644,043, filed on Mar. 10, 2015, in the United States Patent and Trademark Office, which is a continuation application of U.S. patent application Ser. No. 12/616,580, filed on Nov. 11, 2009, in the United States Patent and Trademark Office, now U.S. Pat. No. 9,094,639, which claims priority from Korean Patent Application No. 10-2008-0125455, filed on Dec. 10, 2008 in the Korean Intellectual Property Office, the disclosures of which are incorporated herein by reference in their entireties.

BACKGROUND OF THE INVENTION

Field of the Invention

Apparatuses and methods consistent with the present invention relate to a broadcasting receiving apparatus and a control method thereof, and more particularly, to a broadcasting receiving apparatus and a control method thereof capable of receiving recommendation information.

Description of the Related Art

A broadcasting receiving apparatus is an apparatus which processes an input image signal to be displayed, and includes a set top box which processes a broadcasting signal supplied from a broadcasting station to be displayed, a television receiver which receives and displays an external image signal such as a broadcasting signal, a digital versatile disk, etc.

Recently, as digital broadcasting is introduced, the broadcasting receiving apparatus may previously confirm information about a program broadcasted in each channel by using an electronic program guide (EPG) information supplied from a broadcasting station. Also, as an internet communication is developed, the broadcasting receiving apparatus may receive a broadcasting signal through a ground wave, a cable, etc., and concurrently, may be connected to a communication network to enable a two way communication, or may receive various contents from a service supplying server through an internet protocol (IP) based network to supply to a user.

According to a display environment enabling the two way communication, users may recommend a broadcasting program or contents to other users, and it is necessary to improve a user convenience so that the broadcasting receiving apparatus can receive this recommendation information to satisfy various demands of the users.

SUMMARY OF THE INVENTION

Accordingly, it is an aspect of the present invention to provide a broadcasting receiving apparatus and a control method thereof capable of supplying a broadcasting service having an improved user convenience. The foregoing and/or other aspects of the present invention can be achieved by providing a control method of a broadcasting receiving apparatus, including: receiving recommendation information about a broadcasting program; comparing a time of confirming the recommendation information and a broadcasting time of a recommended program included in the recommendation information; and supplying a function of the broadcasting receiving apparatus for using the recommendation information to correspond to a comparison result.

The time of confirming the recommendation information may include a time of confirming at least one of the recommended programs included in the recommendation information.

The supplying the function of the broadcasting receiving apparatus for using the recommendation information may include generating a user interface (UI) information, and the UI information may include a re-viewing menu if the recommended program is already broadcasted.

The UI information further may include a channel changing menu if the recommended program is currently broadcasted.

The UI information further may include a broadcasting reserving menu if the recommended program is scheduled to be broadcasted. The control method of the broadcasting receiving apparatus may further include processing and displaying an input broadcasting signal, and include the broadcasting time of the recommended program included in the recommendation information with a program guide information included in the broadcasting signal.

The control method of the broadcasting receiving apparatus may further include performing a user authentication, wherein the time of confirming the recommendation information may include a time at which the user authentication is completed.

The receiving the recommendation information may include receiving the recommendation information through a communication network. Another aspect of the present invention may be achieved by providing a broadcasting receiving apparatus, including: an image processing unit which processes an input broadcasting signal; a communicating unit which receives a recommendation information about a broadcasting program; and a control unit which compares a time of confirming the recommendation information and a broadcasting time of a recommended program included in the recommendation information, and controls the image processing unit and the communicating unit to supply a function for using the recommendation information to correspond to a comparison result.

The control unit may determine a time of confirming the recommendation information as a time of confirming at least one of the recommended programs included in the recommendation information. The broadcasting receiving apparatus may further include a user interface (UI) generating unit generating a UI information to supply a function for using the recommendation information, wherein the UI information may include a re-viewing menu if the recommended program is already broadcasted.

The UI information may further include a channel changing menu if the recommended program is currently broadcasted.

The UI information may further include a broadcasting reserving menu if the recommended program is scheduled to be broadcasted. The broadcasting signal input to the image processing unit may include a program guide information, and the control unit may compare the broadcasting time of the recommended program included in the recommendation information with the program guide information included in the broadcasting signal.

The broadcasting receiving apparatus may further include a user input unit for a user authentication, wherein the control unit may determine the time of confirming the recommendation information as a time at which the user authentication is completed.

The communicating unit may receive the recommendation information through a communication network.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
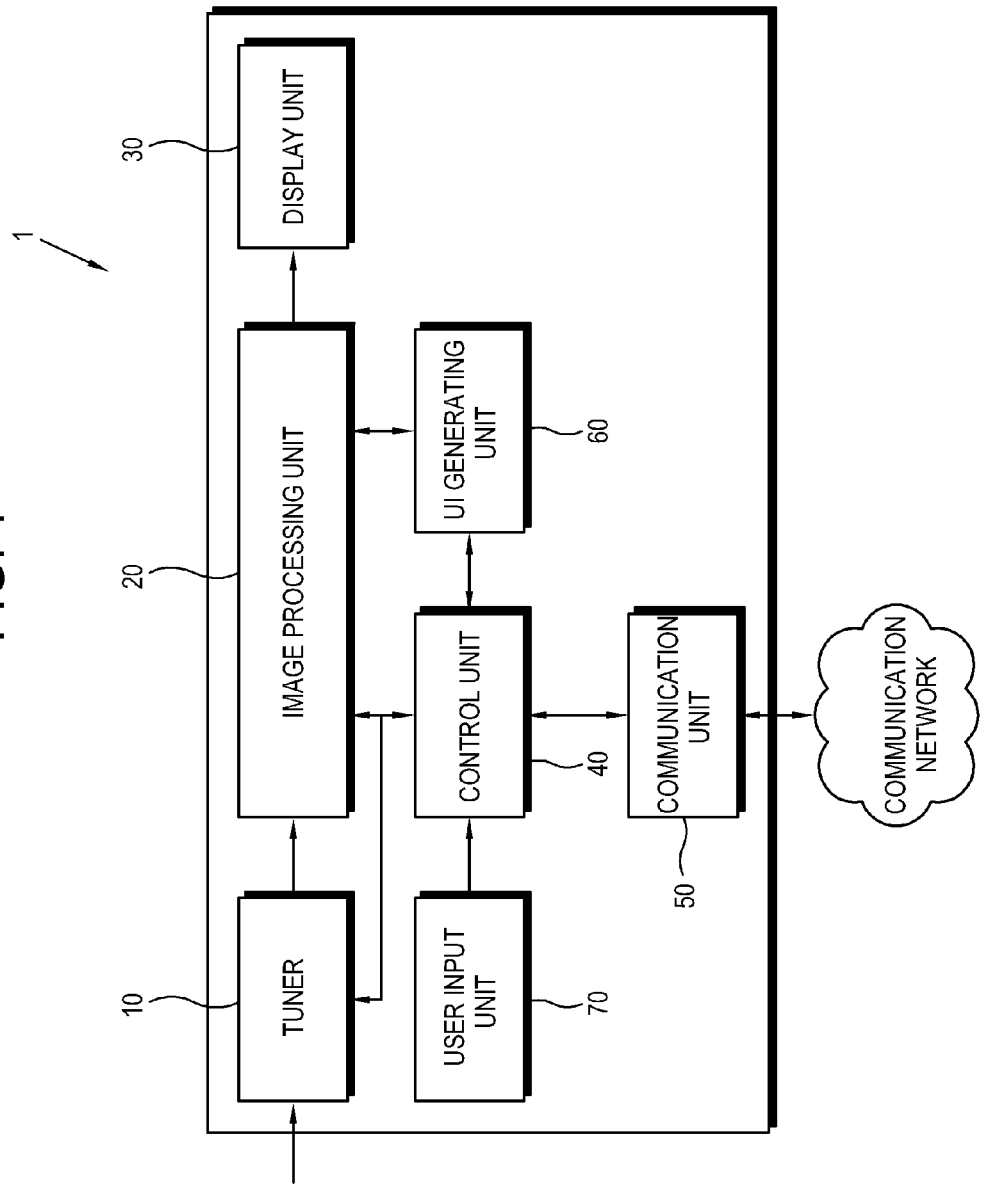
FIG. 1 is a control block diagram of a broadcasting receiving apparatus according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures. Repetitive description with respect to like elements of different exemplary embodiments may be omitted for the convenience of clarity.

Figure 2:
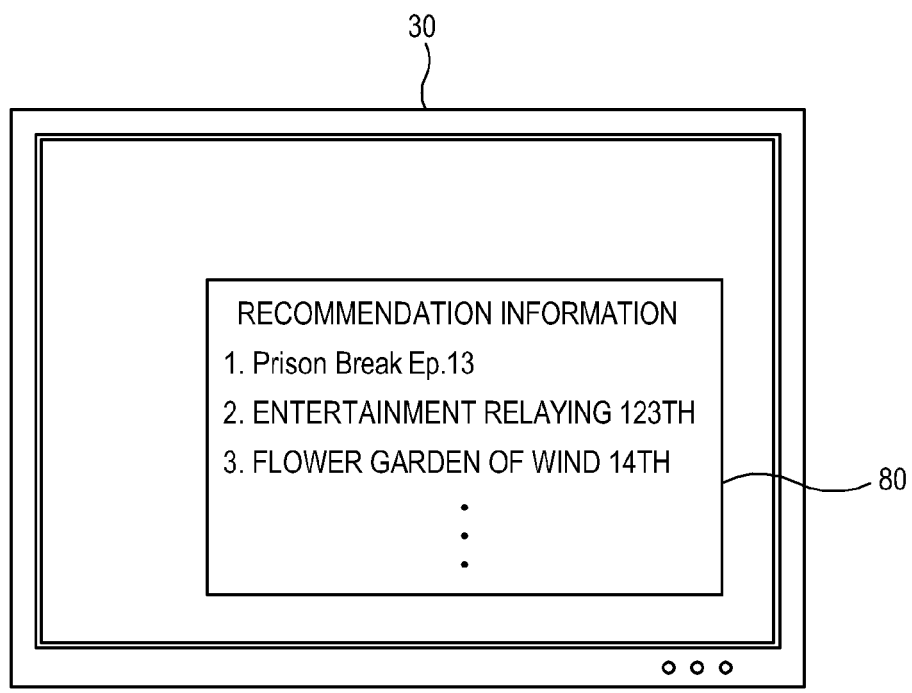
FIG. 2 illustrates recommendation information received to the broadcasting receiving apparatus according to the exemplary embodiment of the present invention.
Figure 3:
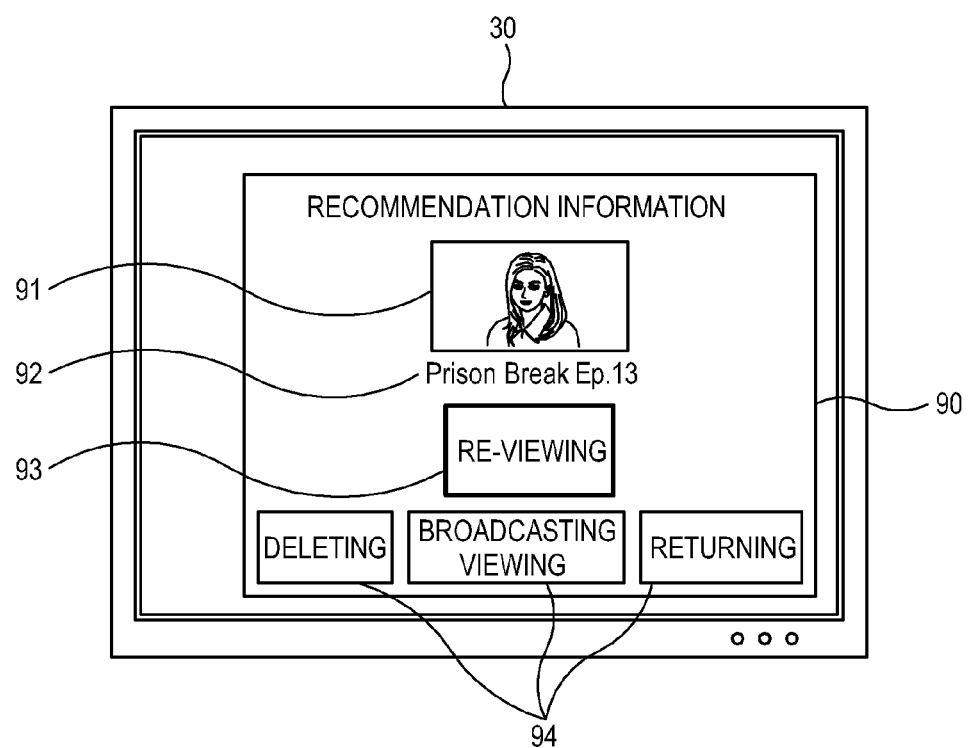
FIGS. 3 to 5 illustrate a user interface (UI) information which supplies a function for using a recommendation information received to the broadcasting receiving apparatus according to the present exemplary embodiment of the present invention.
Figure 4:
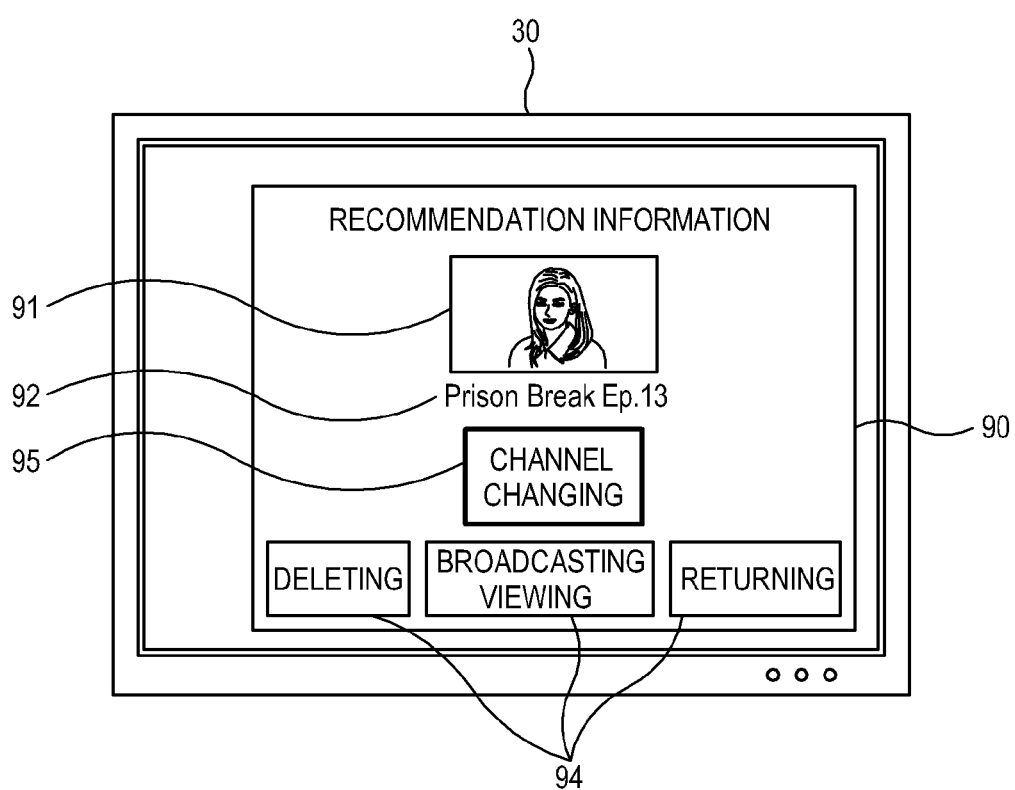
Figure 5:
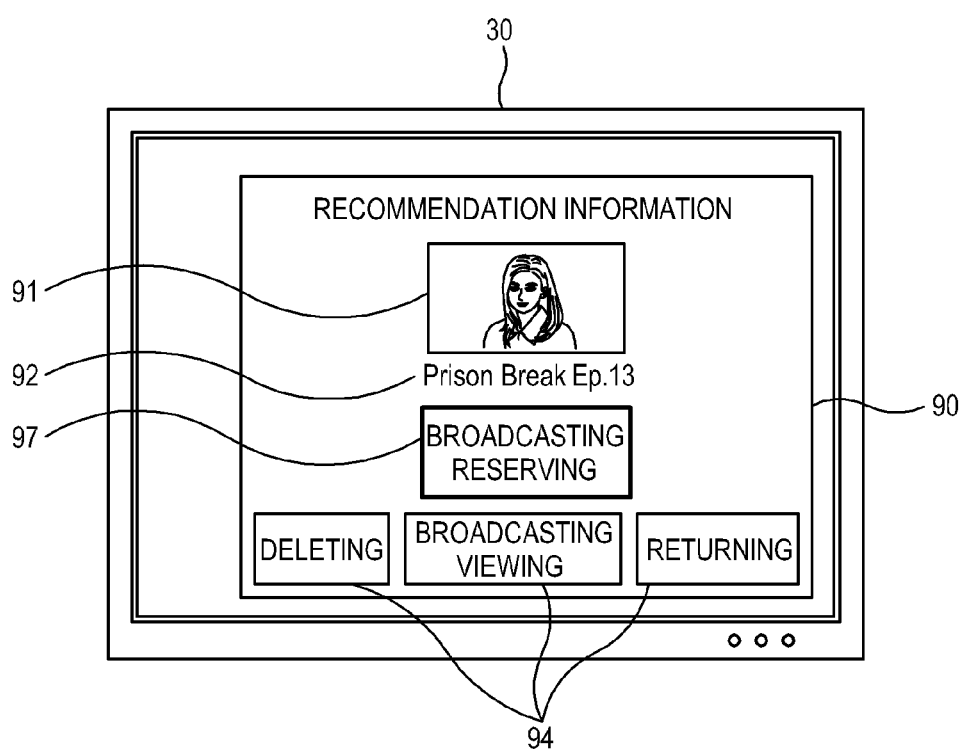

FIG. 1 is a control block diagram of a broadcasting receiving apparatus according to an exemplary embodiment of the present invention, FIG. 2 illustrates a recommendation information received at the broadcasting receiving apparatus according to the exemplary embodiment of the present invention, and FIGS. 3 to 5 illustrate a user interface (UI) information which supplies a function for using recommendation information received at the broadcasting receiving apparatus according to the present exemplary embodiment of the present invention.

As shown therein, a broadcasting receiving apparatus 1 according to an exemplary embodiment of the present invention includes an image processing unit 20 which processes an input broadcasting signal, a communicating unit 50 which receives recommendation information 80 about at least one broadcasting program, and a control unit 40 which controls the image processing unit 20 and the communicating unit 50 to supply a function for using the received recommendation information 80. The broadcasting receiving apparatus 1 according to the present exemplary embodiment may be implemented as a digital TV, a set top box, a desk top computer, a notebook computer, a mobile terminal, a personal digital assistant (PAD), a plasma display panel (PDP) apparatus, etc. Also, the broadcasting receiving apparatus 1 according to the present exemplary embodiment may be configured to be connected to a communication network such as an internet, etc., to enable a two way communication. In an exemplary embodiment, the communication network may enable two way communications between two users or between a user and a server. Hereinafter, the broadcasting receiving apparatus 1 will exemplarily described to have a tuner 10 receiving a broadcasting signal, and a display unit 30 displaying an image signal processed by the image processing unit 20.

The image processing unit 20 processes a broadcasting signal received from the tuner 10 or an image signal received from an external image device (not shown) such as a digital versatile disk (DVD) to be displayed in a display unit 30. That is, the image processing unit 20 performs, based on a control of the control unit 40, an analogue to digital (A/D) converting function for converting an image signal of various formats to a digital image signal of a uniform format, a digital decoding function, a scaling function receiving a digital image signal and/or an analogue image signal to adjust a vertical frequency, resolution, a screen ratio, etc., to be appropriate to an output standard of the display unit 30, and a predetermined format converting function. Also, the image processing unit 20 may process various image signals which may be received through the communicating unit 50. For example, a program guide information may be included in a broadcasting signal input to the image processing unit 20.

The display unit 30 displays an image processed by the image processing unit 20 and a user interface (UI) information 90. The display unit 30 may be implemented as a liquid crystal display (LCD) panel including a liquid crystal, a organic light emitting diode (OLED) panel including an organic light emitting element, a plasma display panel (PDP), etc.

The communicating unit 50 receives the recommendation information 80 from an outside depending on a control of the control unit 40. For example, the communicating unit 50 may be connected to a communication network such as an internet to receive the recommendation information 80 from other connecting users, or may be configured to enable a two way communication to transmit the recommendation information 80 to other connecting users. Also, the communicating unit 50 may be connected to the communication network to transmit and receive information about various contents as well as the recommendation information 80. For example, a name of a recommended program and a broadcasting time of the recommended program are included in the recommendation information 80 received through the communicating unit 50, and one or a plurality of recommended programs may be included. In addition, various information such as a recommender, a recommendatory time, a memo of the recommender, etc., may be included, each of which corresponds to the recommendation information 80 sent by a recommender to the broadcasting receiving apparatus 1.

The control unit 40 compares a point of time of confirming the recommendation information 80 received through the communicating unit 50 and a broadcasting time of a recommended program included in the recommendation information 80, and the control unit 40 supplies a function to a UI generating unit 60 for using the recommendation information corresponding to a result of the comparison. For example, the point of time may be a point of time at which at least one of the recommended programs corresponding to the recommendation information 80 is confirmed. However, the point of time of confirming the recommendation information 80 is not limited thereto, and may be a point of time at which the user completes a user authentication through a user input unit 70.

If a program guide information is included in a broadcasting signal input to the image processing unit 20, the control unit 40 may compare a broadcasting time of a recommended program included in the recommendation information 80 with the program guide information included in the received broadcasting signal. Accordingly, if the recommendation information 80 recommended from a recommender is received and confirmed after a predetermined time elapses, the broadcasting time of the recommended program included in the recommendation information 80 may be different from the program guide information included in the received broadcasting signal, and the broadcasting time of the recommended program included in the recommendation information 80 can be corrected with respect to the program guide information if the broadcasting time is different.

The broadcasting receiving apparatus 1 may further include the user input unit 70. The user input unit 70 outputs various control signals to change a broadcasting channel or control the UI information 90 displayed in the display unit 30 by an operation of a user. The user input unit 70 may be implemented as separate short key or touch pad for selecting these functions, or may be provided a remote control device remotely communicating with display unit 30. The short key or the touch pad may be formed to an outer frame of the display unit 30, and the touch pad may be implemented as a touch panel on the display unit 30. Also, the user input unit 70 may be implemented as a typical input unit such as a keyboard and a mouse. For example, the user input unit 70 may be provided to input information such as an ID and a password of a user to allow the user authentication depending on a control of the control unit 40. Accordingly, the user can receive the recommendation information 80 transmitted to the user after the user confirms that he or she is the intended user for receipt of the recommendation information 80 through the user authentication capable of distinguishing other users connected to the communication network.

The broadcasting receiving apparatus 1 according to the present exemplary embodiment may further include a UI generating unit 60. The UI generating unit 60 may generate various UI information, and display the generated UI information, from among the various UI information, in the display unit 30 depending on a control of the control unit 40. For example, the UI generating unit 60 may generate the UI information 90 to supply a function selected from various functions for using the received recommendation information 80.

For example, the UI information 90 may be configured to be generated if a user selects and confirms at least one recommended program included in the recommendation information 80. Also, the UI information 90 is exemplarily described to be configured to be generated by each selected recommended program, but a plurality of recommended programs may be configured to be displayed in a single UI information 90.

The UI information 90 includes a re-viewing menu 93 as shown in FIG. 3 if, as determined by the control unit 40, a recommended program included in the recommendation information 80 has already been broadcasted. The UI information 90 includes a channel changing menu 95 as shown in FIG. 4 if, as determined by the control unit 40, the recommended program is currently being broadcasted. The UI information 90 includes a broadcasting reserving menu 97 as shown in FIG. 5 if, as determined by the control unit 40, the recommended program is scheduled to be broadcasted at a later point in time. Thus, the control unit 40 determines a comparison result by comparing a point of time of confirming the recommendation information 80 received through the communicating unit 50 and a broadcasting time of a recommended program included in the recommendation information 80, and the UI generating unit 60 generates one of various menus to display on the display unit 30 based on the comparison result. Also, the UI information 90 may further include an image 91 of a recommended program, a name 92 of a recommended program and an operating button 94 as shown in FIG. 3. The operating button 94 may include a deleting button for deleting the UI information 90, a broadcasting viewing button for viewing a program currently broadcasted, and a returning button for returning to a prior function. However, the UI information 90 is not limited to the configuration illustrated in FIG. 3. Alternatively, at least a part of the configuration illustrated in FIG. 3 may be omitted, or other functions may be added.

Accordingly, a user can conveniently view a recommended program both if the recommendation information 80 recommended from a recommender is received and confirmed after a predetermined time elapses, and if the recommendation information 80 recommended from a recommender is directly received and confirmed. That is, if the user is currently operating the display unit 30 and the user directly receives and confirms the recommendation information 80 recommended from the recommender, a point of time at which the user confirms the recommendation information 80 is almost the same as a point of time at which the recommender transmits the recommendation information 80. Accordingly, if the recommender recommends a broadcasting program which is currently broadcasted or scheduled to be broadcasted, since the recommended program included in the recommendation information 80 which the user receives is also currently broadcasted or scheduled to be broadcasted, it is sufficient to intactly display the information in the UI information 90. However, if the recommendation information 80 recommended from the recommender is received and confirmed after some predetermined time elapses, the point of time at which the user confirms the recommendation information 80 is different from the point of time at which the recommender recommends the recommendation information 80. Accordingly, since it is possible that the recommended program included in the recommended program 80 which the user receives has already been completely broadcasted, the time confirming the recommendation information 80 and the broadcasting time of the recommended program included in the recommendation information 80 are compared, and the function using the recommendation information 80 is supplied to correspond to a result thereof, thereby improving a user convenience.

Figure 6:
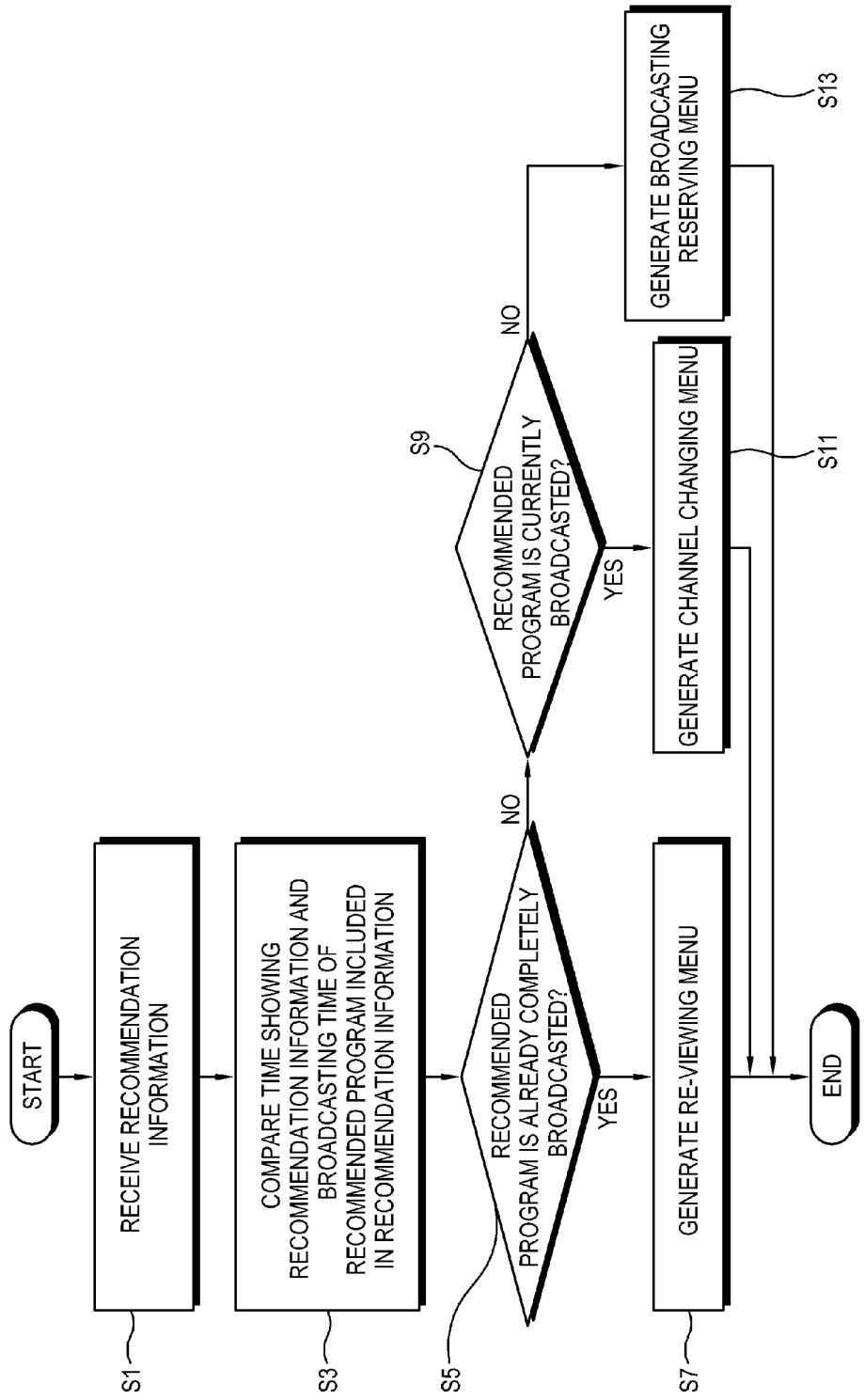
FIG. 6 illustrates a control flowchart of the broadcasting receiving apparatus according to the exemplary embodiment of the present invention.

With this configuration, a control method of the broadcasting receiving apparatus according to the exemplary embodiment of the present invention will be described by referring to FIG. 6.

First, the recommendation information 80 about a broadcasting program is received (operation S1). In this case, for example, the recommendation information 80 is received through the communicating unit 50 connected with the communication network, and a user may receive the recommendation information 80 transmitted to the user through a user authentication.

Then, a point of time at which the recommendation information 80 is confirmed and a broadcasting time of a recommended program included in the recommendation information 80 are compared (operation S3). In this case, the control unit 40 may determine the point of time at which the recommendation information 80 is confirmed as a point of time at which at least one of the recommended programs included in the recommendation information 80 is confirmed, or as a point of time at which the user authentication is completed.

Then, a function of the broadcasting receiving apparatus 1 for using the recommendation information 80 is supplied to a display unit 30 to correspond to a result of the comparison. In this case, the UI generating unit 60 may generate the UI information 90 depending on a control of the control unit 40. Also, the UI generating unit 60 determines whether the recommended program has already been broadcasted or not (operation S5), and generates the UI information 90 including the re-viewing menu 93 if the recommended program has already been broadcasted (operation S7). Also, the UI generating unit 60 determines whether the recommended program is currently being broadcasted or not (operation S9), and generates the UI information 90 including the channel changing menu 95 if the recommended program is currently being broadcasted (operation S11). Also, the UI generating unit 60 generates the UI information 90 including the broadcasting reserving menu 97 if the recommended program has not been broadcasted and is not currently being broadcasted (operation S13). Also, the control unit 40 may further include comparing a broadcasting time of a recommended program included in the recommendation information 80 with a program guide information included in a broadcasting signal.

Accordingly, the broadcasting receiving apparatus 1 according to the present exemplary embodiment compares the point of time of confirming the recommendation information 80 and the broadcasting time of the recommended program included in the recommendation information 80, and supplies the function conveniently using the recommendation information 80 to correspond to the result thereof if the user receives and confirms the recommendation information 80 recommended from the recommender after a predetermined time elapses, as well as if the user directly receives and confirms the recommendation information 80 recommended by the recommender, thereby improving a user convenience.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting signal receiving apparatus, comprising:
a display;
a broadcasting signal receiver configured to receive a broadcasting signal comprising an image signal and program guide information;
a communicator configured to communicate with an external apparatus;
an image processor configured to process the broadcasting signal; and
a controller configured:
to control the display to display an image based on the processed broadcasting signal and a recommended broadcasting program list including at least one recommended broadcasting program based on recommendation information received from the external apparatus via the communicator, the recommendation information including a name and a broadcasting time of the at least one recommended broadcasting program, and
in response to an input for selecting a recommended broadcasting program included in the recommended broadcasting program list, to display a first user interface including a menu item for watching the selected recommended broadcasting program upon a determination that the selected recommended broadcasting program is currently available, the determination being based on a broadcasting time of the selected recommended broadcasting program, and to display a second user interface including a menu item for reserving the selected recommended broadcasting program upon a determination that the selected recommended broadcasting program is available at a later time, the determination being based on the broadcasting time of the selected recommended broadcasting program,
wherein the controller is further configured to change a current channel to a channel corresponding to the selected recommended broadcasting program in response to the menu item for watching the selected recommended broadcasting program being selected.

2. The broadcasting signal receiving apparatus according to claim 1, wherein the controller displays the first user interface without displaying a menu item for reserving the selected recommended broadcasting program.

3. The broadcasting signal receiving apparatus according to claim 1, wherein the controller displays the second user interface without displaying the menu item for watching the selected recommended broadcasting program.

4. The broadcasting signal receiving apparatus according to claim 1, wherein the controller corrects the broadcasting time of the recommended program included in the recommendation information based on the program guide information.

5. The broadcasting signal receiving apparatus according to claim 1, wherein the input for selecting the recommended broadcasting program is made by a user.

6. The broadcasting signal receiving apparatus according to claim 1, wherein, when the selected recommended broadcasting program is already broadcasted, the displayed menu item is a menu item for executing a re-viewing function for review of the selected recommended broadcasting program.

7. The broadcasting signal receiving apparatus according to claim 1, wherein the controller is configured to compare the broadcasting time of the selected recommended broadcasting program included in the recommendation information with a time when the input for selecting the recommended broadcasting program is received.

8. The broadcasting signal receiving apparatus according to claim 1, wherein the communicator is connected to a communications network to transmit and receive information about various contents and the recommendation information.

9. The broadcasting signal receiving apparatus according to claim 8, wherein the communicator is configured to transmit the recommendation information to other external apparatuses which are connected to the communications network.

10. The broadcasting signal receiving apparatus according to claim 1, wherein the controller is further configured to control the broadcasting signal receiver to change the current channel to the channel corresponding to the selected recommended broadcasting program in response to the menu item for watching the selected recommended broadcasting program being selected.

11. The broadcasting signal receiving apparatus according to claim 1, wherein the first user interface comprises the menu item for watching the selected recommended broadcasting program and an image representing the selected recommended broadcasting program.

12. A control method of a broadcasting signal receiving apparatus, the method comprising:
receiving a broadcasting signal comprising an image signal and a program guide information;
processing the broadcasting signal;

displaying an image based on the processed broadcasting signal and a recommended broadcasting program list including at least one recommended broadcasting program based on recommendation information received from an external apparatus, the recommendation information including a name and a broadcasting time of the at least one recommended broadcasting program, displaying, in response to an input for selecting a recommended broadcasting program included in the recommended broadcasting program list, a first user interface including a menu item for watching the selected recommended broadcasting program upon a determination that the selected recommended broadcasting program is currently available, the determination being based on a broadcasting time of the selected recommended broadcasting program, displaying, in response to an input for selecting a recommended broadcasting program included in the recommended broadcasting program list, a second user interface including a menu item for reserving the selected recommended broadcasting program upon a determination that the selected recommended broadcasting program is available at a later time, the determination being based on the broadcasting time of the selected recommended broadcasting program, and changing, in response to the menu item for watching the selected recommended broadcasting program being selected, a current channel to a channel corresponding to the selected recommended broadcasting program.

13. The control method of a broadcasting signal receiving apparatus according to claim 12, the method further comprising displaying the first user interface without displaying a menu item for reserving the selected recommended broadcasting program.

14. The control method of a broadcasting signal receiving apparatus according to claim 12, the method further comprising displaying the second user interface without displaying the menu item for watching the selected recommended broadcasting program.

15. The control method of a broadcasting signal receiving apparatus according to claim 12, the method further comprising correcting the broadcasting time of the recommended program included in the recommendation information based on the program guide information.

16. The control method of a broadcasting signal receiving apparatus according to claim 12, wherein the input for selecting the recommended broadcasting program is made by a user.

17. The control method of a broadcasting signal receiving apparatus according to claim 12, wherein, when the selected recommended broadcasting program is already broadcasted, the displayed menu item is a menu item for executing a re-viewing function for review of the selected recommended broadcasting program.

18. The control method of a broadcasting signal receiving apparatus according to claim 12, the method further comprising comparing the broadcasting time of the selected recommended broadcasting program included in the recommendation information with a time when the input for selecting the recommended broadcasting program is received.

19. The control method of a broadcasting signal receiving apparatus according to claim 12, the method further comprising transmitting and receiving information about various contents and the recommendation information from a communications network.

20. The control method of a broadcasting signal receiving apparatus according to claim 19, the method further comprising transmitting the recommendation information to other external apparatuses which are connected to the communications network.

21. The control method of a broadcasting signal receiving apparatus according to claim 12,
wherein the receiving is performed via a broadcasting signal receiver, and
wherein the changing comprises controlling the broadcasting signal receiver to change the current channel to the channel corresponding to the selected recommended broadcasting program in response to the menu item for watching the selected recommended broadcasting program being selected.

22. The control method of a broadcasting signal receiving apparatus according to claim 12, wherein the first user interface comprises the menu item for watching the selected recommended broadcasting program and an image representing the selected recommended broadcasting program.

23. A computer program product comprising a computer readable medium having a computer program stored thereon, which, when executed by a computing device, cause the computing device to:

receiving a broadcasting signal comprising an image signal and a program guide information;

processing the broadcasting signal;

displaying an image based on the processed broadcasting signal and a recommended broadcasting program list including at least one recommended broadcasting program based on recommendation information received from an external apparatus, the recommendation information including a name and a broadcasting time of the at least one recommended broadcasting program, displaying, in response to an input for selecting a recommended broadcasting program included in the recommended broadcasting program list, a first user interface including a menu item for watching the selected recommended broadcasting program upon a determination that the selected recommended broadcasting program is currently available, the determination being based on a broadcasting time of the selected recommended broadcasting program, displaying, in response to an input for selecting a recommended broadcasting program included in the recommended broadcasting program list, a second user interface including a menu item for reserving the selected recommended broadcasting program upon a determination that the selected recommended broadcasting program is available at a later time, the determination being based on the broadcasting time of the selected recommended broadcasting program, and changing, in response to the menu item for watching the selected recommended broadcasting program being selected, a current channel to a channel corresponding to the selected recommended broadcasting program.

24. The computer program product of claim 23, wherein the computer readable program is stored in the computer readable storage medium in a server and wherein the computer program is downloaded over a network to the computing device.

* * * * *